Oct. 15, 1929.　　　　J. KOZISEK　　　1,731,425
ALTERNATING CURRENT COMMUTATOR MACHINE
Filed Oct. 3, 1925
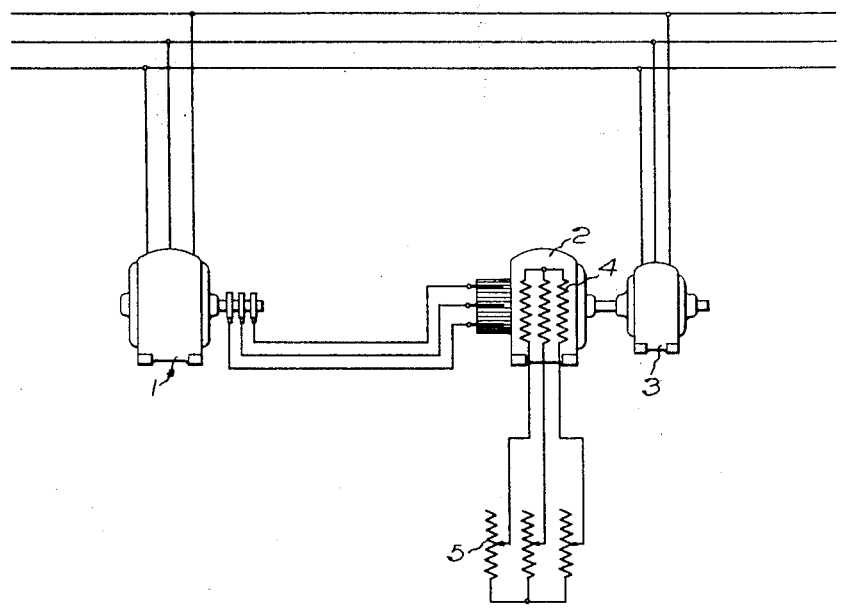
WITNESSES:
G. S. Neilson
S. W. Pineles
INVENTOR
Jaroslav Kozisek
BY Wesley G. Carr
ATTORNEY Patented Oct. 15, 1929

1,731,425

UNITED STATES PATENT OFFICE

JAROSLAV KOZISEK, OF BERLIN-CHARLOTTENBURG, GERMANY, ASSIGNOR TO WESTINGHOUSE ELECTRIC AND MANUFACTURING COMPANY, OF NEW YORK, N. Y., A CORPORATION

ALTERNATING-CURRENT COMMUTATOR MACHINE

Application filed October 3, 1925, Serial No. 60,262, and in Germany October 4, 1924.

My invention relates to alternating current commutator machines and particularly to an arrangement or system for obtaining a self-excitation in commutator machines and in particular in such commutator machines which serve as cascaded or rear machines for the phase compensation or for the regulation of the speed of induction machines. It is well known that the commutator rear machine can be excited by the load current of the main machine. A phase compensation is then, however, impossible when the machine runs under light load. In another known arrangement the regulation is effected by a special transformer so that the cost of the total set is considerably increased thereby.

For the purpose of making an alternating current commutator machine self-exciting it is according to my invention provided with a winding (phase winding or squirrel-cage winding) located on the stator which winding is independent from the rotor and the inductive and ohmic resistance of which is so chosen or adjusted that a self-excitation of the alternating current commutator machine takes place. Experiments have shown that this may be brought about in every case by correspondingly proportioning this winding located on the stator.

The drawing affixed hereto illustrates one embodiment of my invention.

Referring to this drawing it will be seen that for the phase compensation of the induction motor 1 a commutator rear machine 2 is provided which is only electrically connected with the induction motor. The driving motor for the commutator rear machine is designated by 3. This rear machine is according to my invention provided with a phase winding 4 located on the stator. In the circuit of this phase winding is connected an adjustable ohmic resistance 5. This arrangement or system has the property that the commutator rear machine excites itself so that a phase compensation takes place even when the machine set runs under light load. The regulating resistance 5 connected in the circuit of the winding 4 also serves to control the frequency of the voltage produced by the self-excitation in the rear machine. Instead of equipping the rear machine on the stator with a phase winding for the self-excitation a short-circuit winding may equally well be used provided that its ohmic or also the inductive resistance of the said short-circuit winding possesses a corresponding value.

It is well known that a polyphase commutator machine, having no winding on its stator, and being driven at a sufficiently high speed, will generate leading electromotive forces by reason of the armature conductors cutting the field produced by the armature reaction. If such a machine is connected in the secondary circuit of an induction motor, it may be utilized to produce phase compensation. When the induction motor is running light, the secondary currents are so small that the electromotive forces generated by the armature-reaction flux in the commutator machine are not sufficient to overcome the impedances of the circuits therefor, so that the commutator machine becomes ineffective. The present invention is designed to overcome the above-mentioned difficulty by providing a closed-circuited polyphase stator winding on the commutator machine, having such resistance and reactance that, when the induction motor is running light, sufficient currents will be induced in the stator winding of the commutator machine to boost the armature-reaction flux sufficiently to cause the commutator machine to build up an electromotive force which, as before, is a leading electromotive force. Preferably, also, some means is provided for changing the effectiveness of the stator exciting winding of the commutator machine, so that the electromotive forces generated therein may be properly controlled.

I claim as my invention:

1. The combination with a main induction motor having primary and secondary windings, of a cascaded commutator machine connected in circuit with said secondary winding, and means for driving said commutator machine, said commutator machine supplying phase-advancing currents to the secondary winding of said induction machine and being normally excited mainly by the armature reaction of said secondary-winding currents of said induction motor flowing in the commutator circuits of said commutator machine, characterized by the fact that said commutator machine is provided with a closed-circuited polyphase stator exciting winding having such ohmic and inductive resistances as to excite said commutator machine when said secondary currents are too small to produce an effective excitation by armature reaction.

2. The combination with a main induction motor having primary and secondary windings, of a cascaded separately driven commutator machine connected in circuit with said secondary winding, and means for driving said commutator machine, said commutator machine supplying phase-advancing currents to the secondary winding of said induction machine and being normally excited mainly by the armature reaction of said secondary-winding currents of said induction motor flowing in the commutator circuits of said commutator machine, characterized by the fact that said commutator machine is provided with a closed-circuited polyphase stator exciting winding having such ohmic and inductive resistance as to excite said commutator machine when the armature currents are too small to produce an effective excitation by armature reaction, and means for changing the effectiveness of said exciting winding during the operation of the device.

3. The combination with a main induction motor having phase-wound primary and secondary windings, of a normally armature-excited cascaded commutator machine connected in circuit with said secondary winding, and means for driving said commutator machine, said commutator machine supplying phase-advancing currents to the secondary winding of said induction machine and being normally excited mainly by the armature reaction of said secondary-winding currents of said induction motor flowing in the commutator circuits of said commutator machine, characterized by the fact that said commutator machine is provided with means separate from the armature of said commutator machine for causing said commutator machine to be traversed by substantially wattless currents, other than the secondary currents of said induction motor, whereby said commutator machine may be made self-exciting, under light-load conditions of said induction motor.

4. The combination with a main induction motor having phase-wound primary and secondary windings, of a normally armature-excited cascaded commutator machine connected in circuit with said secondary winding, and means for driving said commutator machine, said commutator machine supplying phase-advancing currents to the secondary winding of said induction machine and being normally excited mainly by the armature reaction of said secondary-winding currents of said induction motor flowing in the commutator circuits of said commutator machine, characterized by the fact that said commutator machine is provided with means separate from the armature of said commutator machine for causing said commutator machine to be traversed by substantially wattless currents, other than the secondary currents of said induction motor, whereby said commutator machine may be made self-exciting, under light-load conditions of said induction motor.

In testimony whereof I affix my signature.

JAROSLAV KOZISEK.